United States Patent [19]

Kubo et al.

[11] Patent Number: 4,761,542

[45] Date of Patent: Aug. 2, 1988

[54] AUTOMATIC MONEY RECEIVING AND PAYING METHOD AND APPARATUS

[75] Inventors: Yuji Kubo, Nakajomachi; Eiichi Ise, Niigatashi; Seietu Takahashi, Nakajomachi, all of Japan

[73] Assignee: Hitachi, Ltd., Tokyo, Japan

[21] Appl. No.: 758,785

[22] Filed: Jul. 25, 1985

[30] Foreign Application Priority Data

Jul. 27, 1984 [JP] Japan ................................ 59-155208

[51] Int. Cl.[4] ................................................ G06F 15/30

[52] U.S. Cl. ......................................... 235/379; 360/12

[58] Field of Search .................... 235/379, 490; 360/12

[56] References Cited

U.S. PATENT DOCUMENTS

| | | | |
|---|---|---|---|
| 3,388,403 | 6/1968 | Gieringer et al. | 235/490 X |
| 3,876,840 | 4/1975 | Bryant | 360/12 X |
| 3,943,335 | 3/1976 | Kinker et al. | 235/379 |
| 4,319,336 | 3/1982 | Anderson et al. . | |
| 4,438,326 | 3/1984 | Uchida . | |
| 4,593,183 | 6/1986 | Fukatsu | 235/379 |

*Primary Examiner*—David L. Trafton
*Attorney, Agent, or Firm*—Fay, Sharpe, Beall, Fagan, Minnich & McKee

[57] ABSTRACT

A plurality of kinds of guidance information are stored in advance in an automatic money receiving and paying apparatus, and the information, which is recorded on a recording medium, on the characteristics of a user is read, the necessary kinds of information being then selected from the above-mentioned plurality of kinds of guidance information on the basis of the information on the characteristics of the user so as to use the selected information for guiding the user. Therefore, the operational guidance for a user can be done suitably, and the time for operating an automatic money receiving and paying apparatus can be reduced.

17 Claims, 19 Drawing Sheets

AUTOMATIC MONEY RECEIVING AND PAYING METHOD AND APPARATUS

BACKGROUND OF THE INVENTION

This invention relates to an automatic money receiving and paying method and apparatus.

A conventional automatic money receiving and paying system, which includes an automatic money receiving and paying apparatus and a monitor unit for governing the operation of this apparatus, is capable, as shown in, for example, Japanese Patent Laid-Open No. 40592/1978, of guiding and monitoring an operation of the system on the basis of the displayed stereotyped guidance.

However, since this money receiving and paying system has no capability of guiding and monitoring while it is in use, an operation thereof on the basis of such guidance that suits the characteristics of a user, would result in instances where a user is not given such guidance that enables the system to be operated smoothly.

For example, when a visually-handicapped person deposits or withdraws his money by utilizing this system, the displayed guidance, which is to be visually confirmed, is not helpful to him; even when a visually-handicapped person is guided for an operation of this system by such displayed guidance, he cannot deposit and withdraw his money.

SUMMARY OF THE INVENTION

An object of the present invention is to provide an automatic money receiving and paying method and apparatus which can be smoothly practiced and operated by a user.

Another object of the present invention is to reduce the time for which a user practices and operates an automatic money receiving and paying method and apparatus.

Still another object of the present invention is to increase the number of types of users of an automatic money receiving and paying apparatus.

The present invention is directed to an automatic money receiving and paying method and apparatus, in which the data indicating the characteristics of a user are stored in an information retainer medium, such as a magnetic card and are reproduced and identified when the user operates the automatic money receiving and paying apparatus, to thereby switch the displayed guidance to a guidance suitable for him, whereby the user is guided for a suitable operation of the apparatus.

DESCRIPTION OF THE PREFERRED EMBODIMENT

Figure 1:
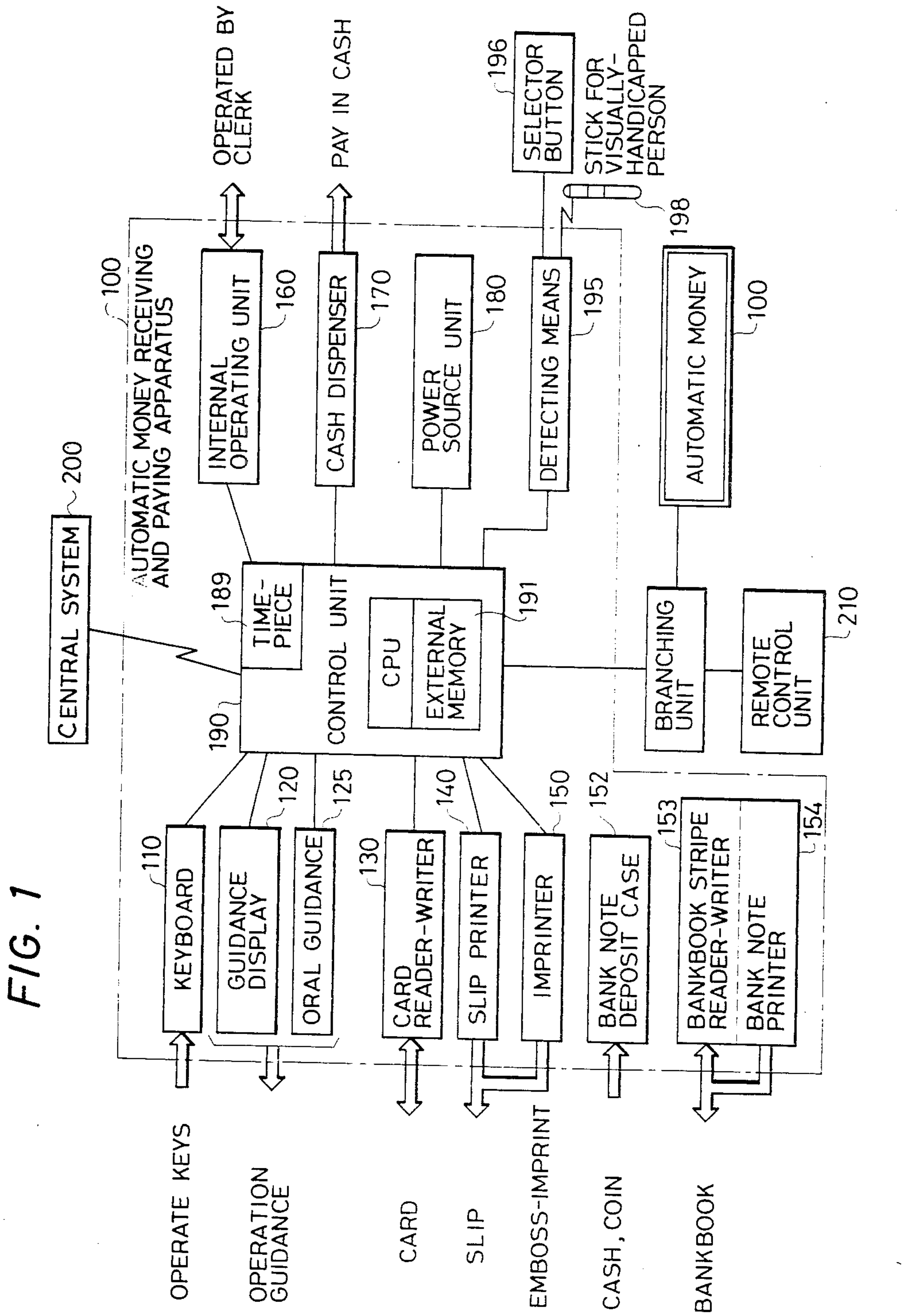
FIG. 1 is a block diagram of an embodiment of the present invention.

An embodiment of the present invention will now be described in detail with reference to the drawings. FIG. 1 shows an automatic money receiving and paying system consisting of an automatic money receiving and paying apparatus (which will hereinafter be referred to as "ATM") 100, a remote-controlled monitor unit (which will hereinafter be referred to as "RPL") 210, and a central system 200. ATM 100 consists of a key board mechanism 110, a visual guidance display (guidance display unit) 120, an aural guidance unit (guidance display unit) 125, a card (recording medium) read/write mechanism 130 (information reading unit), a slip printing unit 140, an imprinter 150, a deposited bank note container 152, a reader/writer 153 of a stripe on a bankbook, a bankbook printer 154, an internal operating unit 160, a cash dispenser 170, a power source unit 180, a selector button 196 for guidance to be displayed, means 195 (information reading unit) for detecting a signal from a stick 198 (recording medium) for a visually-handicapped person, and a control unit 190.

This control unit is provided with a CPU consisting of a computing element and a program indicating the basic operational procedure of the computing element, an external memory unit 191 in which the operational procedure (shown in the flow chart of an operation of the apparatus, and the guidance files, both of which will be described later) for actuating the apparatus as an automatic money receiving and paying apparatus through CPU is stored, and a timepiece indicating the year, month, day and time. The control unit 190 is electrically connected to the parts 110–152, 160–198 and which are arranged therearound, it is adapted to receive signals from these parts in accordance with the order stored in the external memory unit 191, and supply a control signal to these parts and control the actions thereof.

Figure 2:
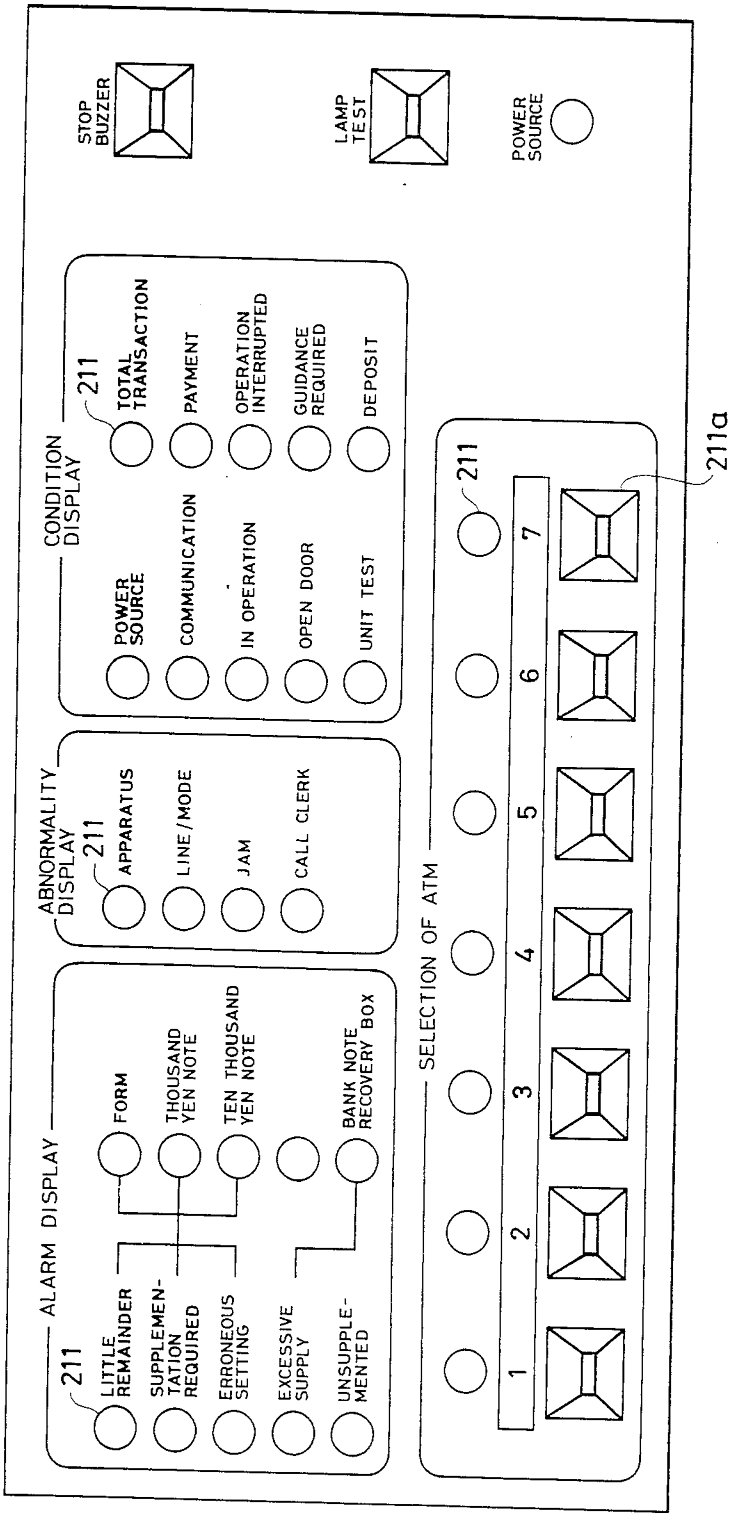
FIG. 2 illustrates a display panel in a remote-controlled monitor unit.

FIG. 2 shows a display control surface of RPL 210, in which reference numeral 211 denotes guide display lamps. To be concrete, these lamps are adapted to display a warning, the occurrence of an accident and the actual operational condition, and guide the selection of ATM. When one of the ATM selection lamp 211 is lit, it indicates ATM selected by a selector switch 211*a*.

Figure 3A:
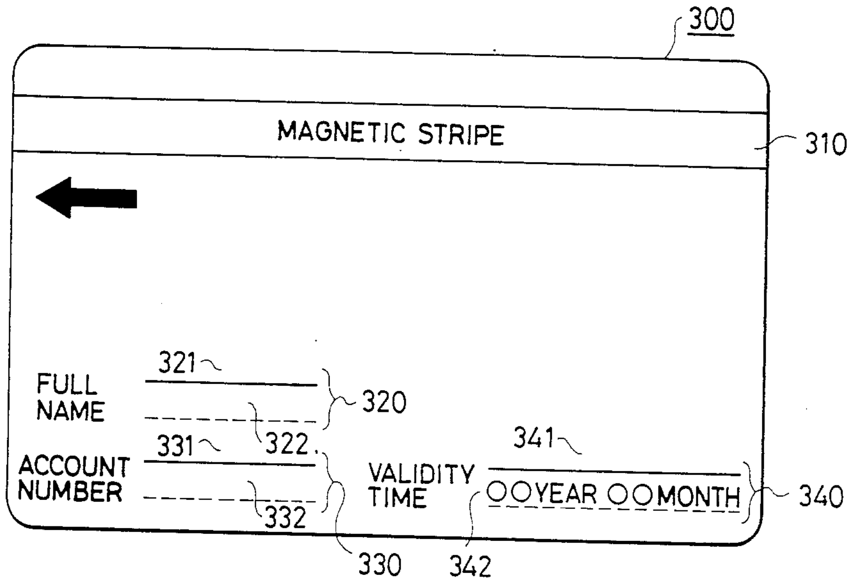
FIGS. 3(*a*) and 3(*b*) illustrate the information registered on a recording medium (magnetic card)
Figure 3B:
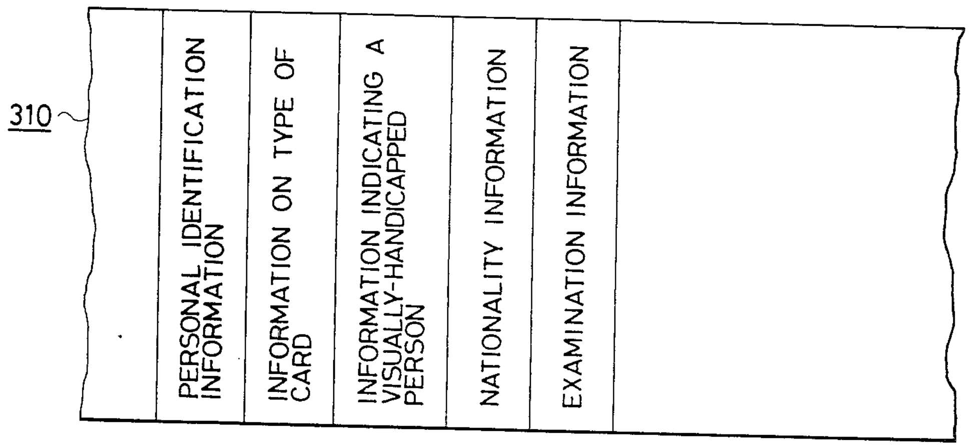
Figure 4A:
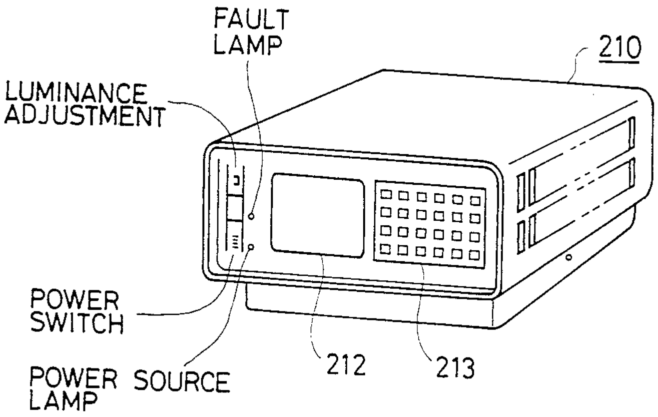
FIGS. 4(*a*), 4(*b*), 5(*a*) to 5(*d*), and 6 illustrate various types of remote-controlled monitor units.
Figure 6:
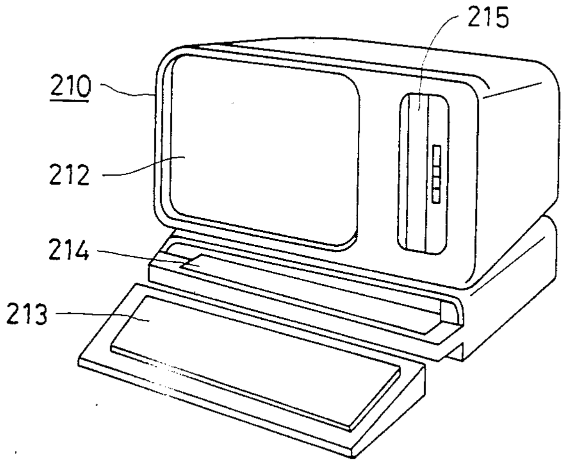
Figure 4B:
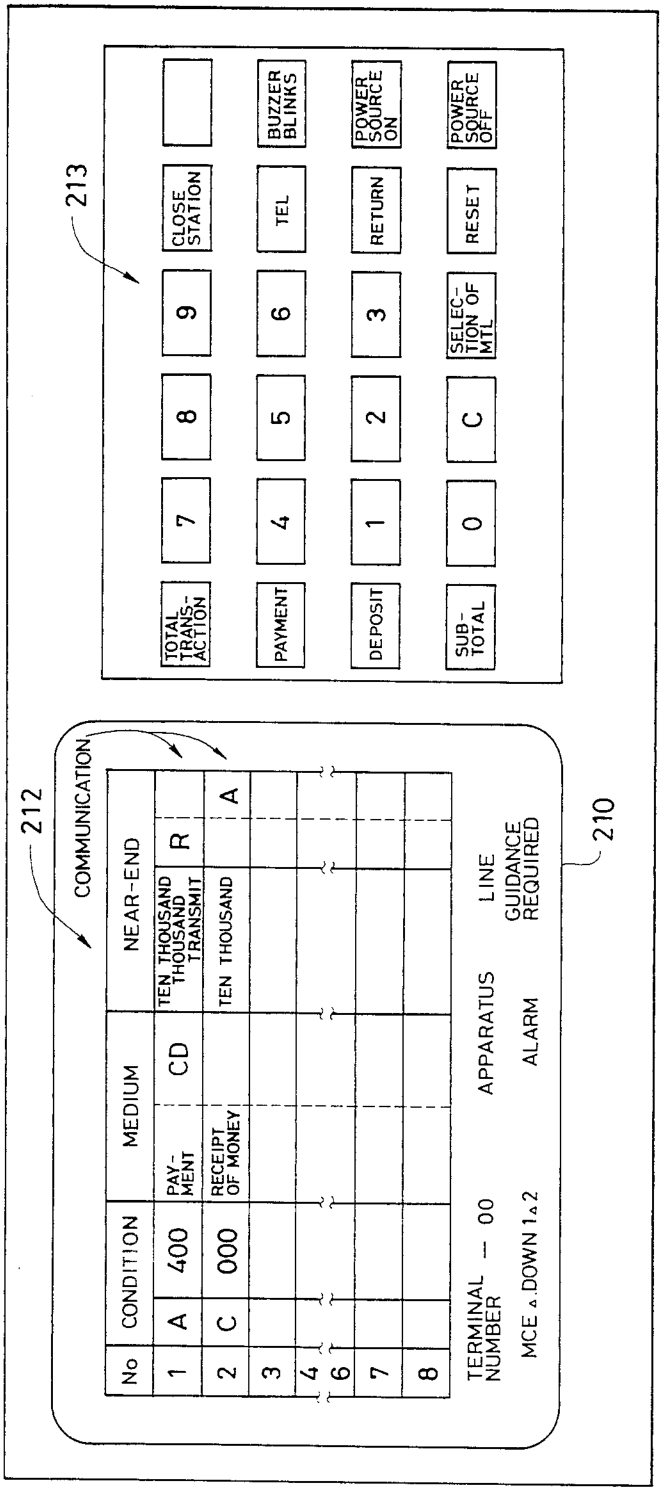
Figure 5B:
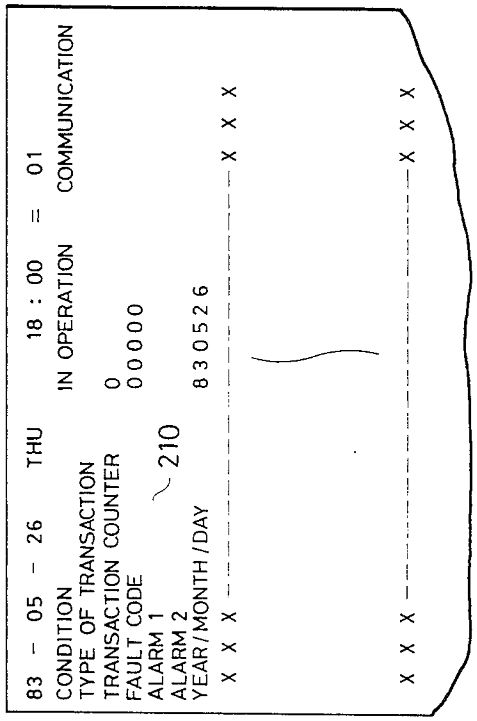
Figure 5A:
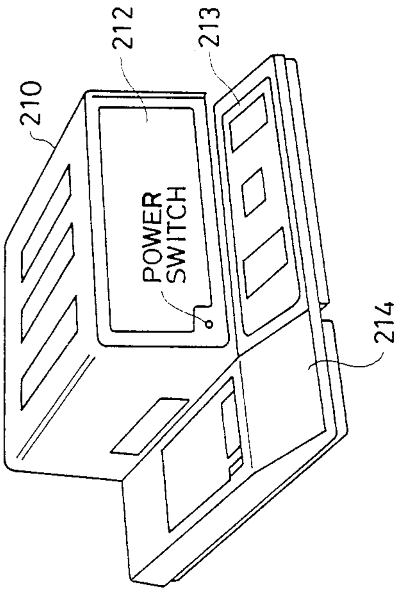
Figure 5C:
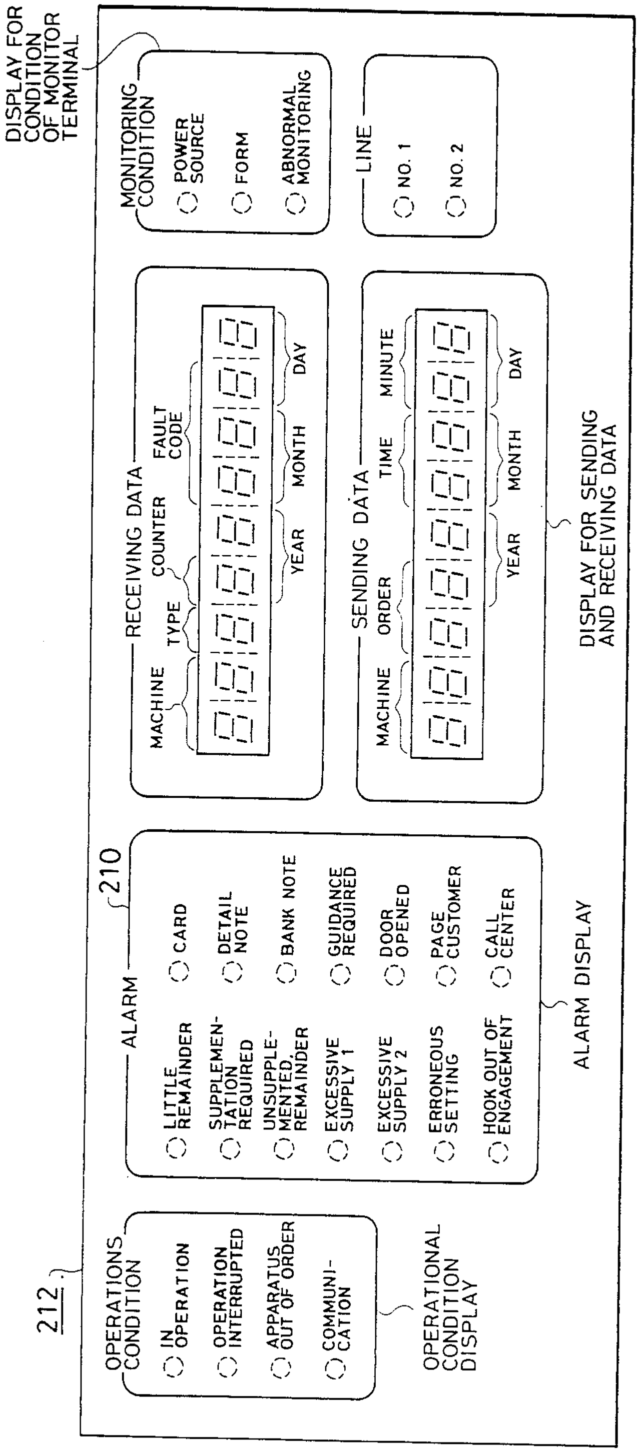
Figure 5D:
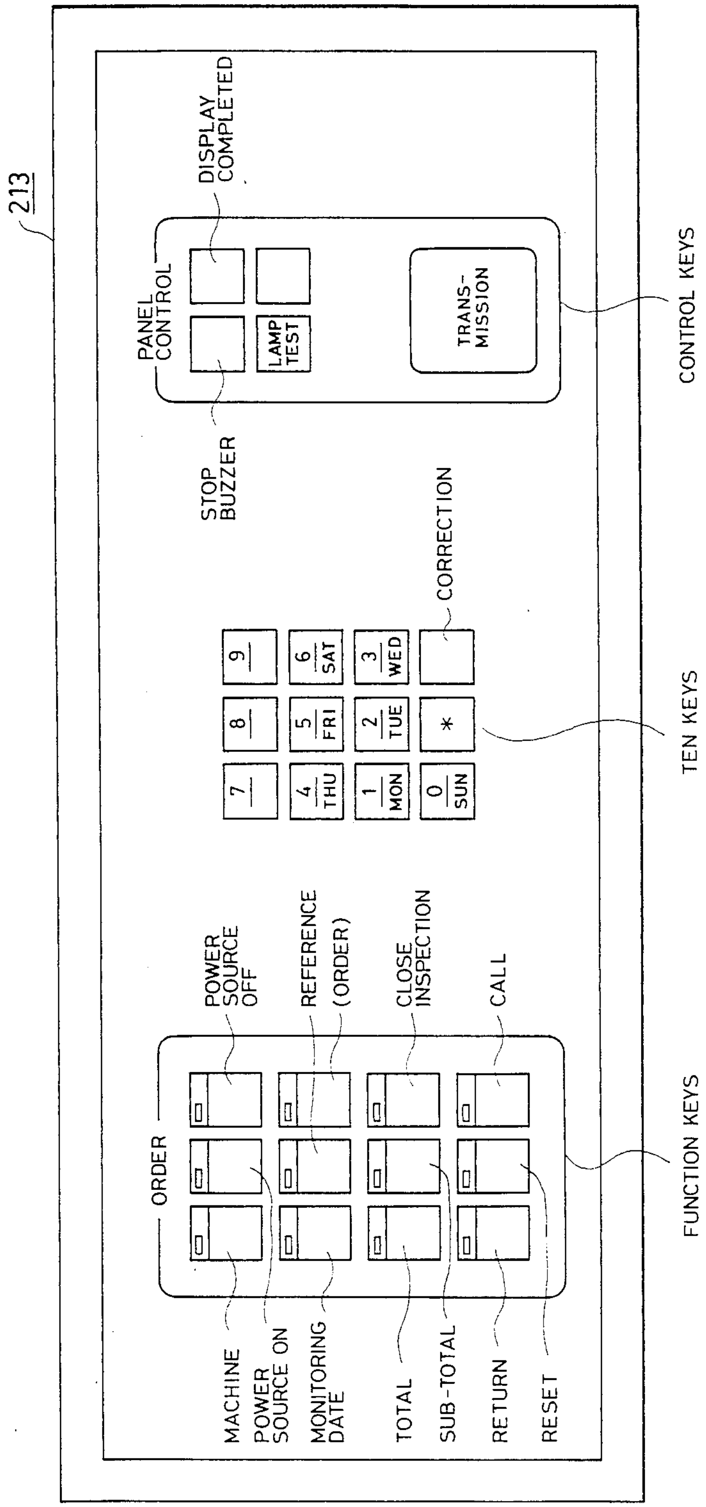
Figure 7:
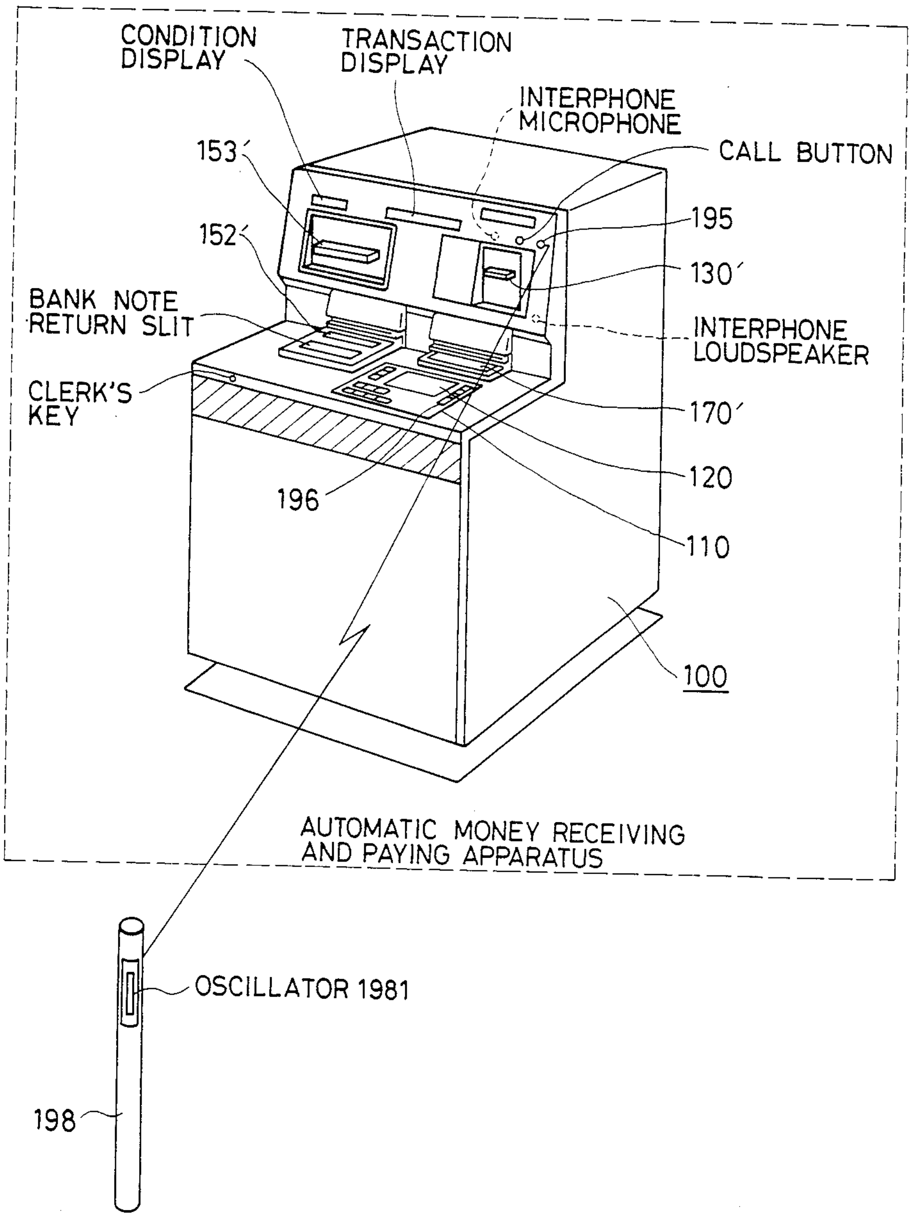
FIG. 7 is a perspective view of an embodiment of an automatic money receiving and paying apparatus according to the present invention.

FIG. 3(*a*) shows a magnetic card 300 used for the automatic money receiving and paying system, and having a magnetic stripe 310, in which, as indicated in FIG. 3(*b*), a symbol representing the personal identification information i.e., indicating that the card holder is a visually-handicapped person or a visually-non-handicapped person, a symbol representing the nationality of the card holder, and a symbol representing the type of the card (card issued by the card holder's bank, card issued by some other bank, or a credit card) are magnetically recorded, and emboss-imprinted portions including the information 320 on the card holder's name, the information 330 on the account number, and the information 340 on the expiration of validity time. Each of the name information 320, account number information 330 and validity time information 340 in the emboss-imprinted portion consists of two pieces of identical information emboss-imprinted in regular characters and braille points 322, 321; 332, 331; 342, 341. FIGS. 4(*a*)–6 illustrate the details of examples of RPL shown in FIG. 2. These machines can be selected suitably in accordance with the environment in which this system is used. The RPL shown in FIG. 4(*a*) has a display portion, shown in FIG. 4(*b*), consisting of CRT picture frame, and is capable of displaying a great deal of guiding information in detail. The RPL also has command keys with respect to ATM in its control portion. Accordingly, ATM under observation can be remote-controlled to render services to the users, and the operation-managing efficiency of the system can be improved. FIG. 5(*a*) illustrates another RPL, the guidance display portion of which, as indicated in FIG. 5(*c*), is of the same fixed display type as that of RPL shown in FIG. 2. The RPL of FIG. 5(*a*) further has a printer portion 214, and command keys 213 with respect to ATM. This RPL can be remote-controlled in the same way as RPL of FIGS. 4(*a*) and 4(*b*). Since RPL of FIG. 5(*a*) is capable of printing data as shown in FIG. 5(*b*), by the printer portion so as to preserve the same, the statistic service (concerning, for example, the operational condition on the actual day) can be rendered by ATM under observation, so that the operation-managing efficiency can be improved. The RPL shown in FIG. 6 has all of the characteristics of the display portion 212 of RPL of FIGS. 4(*a*) and 4(*b*) and the printer portion 212 and control portion 213 of RPL of FIG. 5(*d*), and is provided with a floppy disc 215 as an external memory means. This floppy disc 215 is adapted to store the condition of and information on the automatic money receiving and paying apparatus, and capable of displaying this memorized information when a person in charge of managing the apparatus wants to see the total operational condition of the apparatus under observation. This enables the operation efficiency to be improved. FIG. 7 shows a concrete examples of stick 198 for a visually-handicapped person, selector buttons 196 and detecting means 195 in the system of FIG. 1.

Figure 8A:
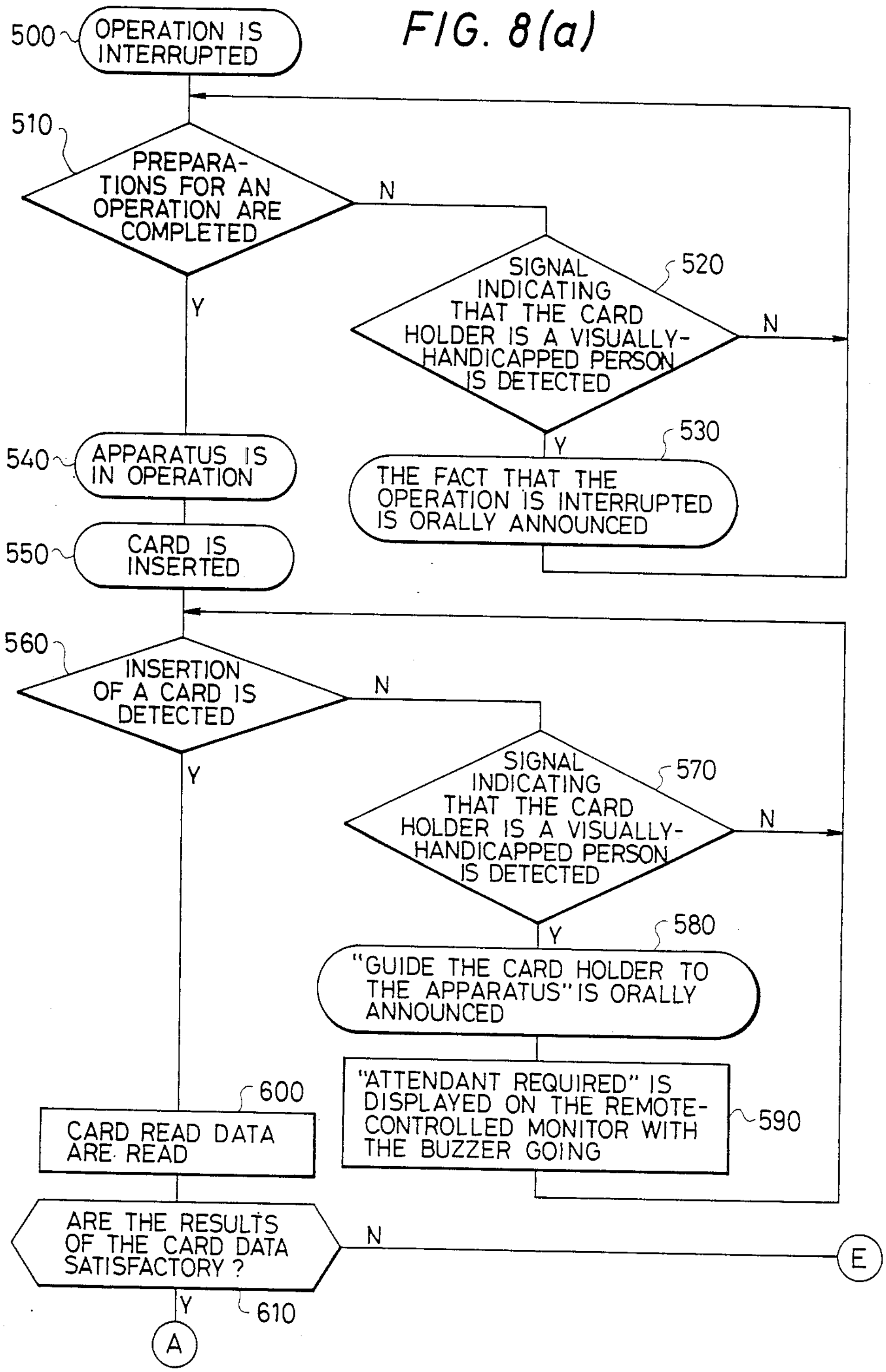
FIGS. 8(*a*)–11(*b*) are flow chart operations of the apparatus.
Figure 8B:
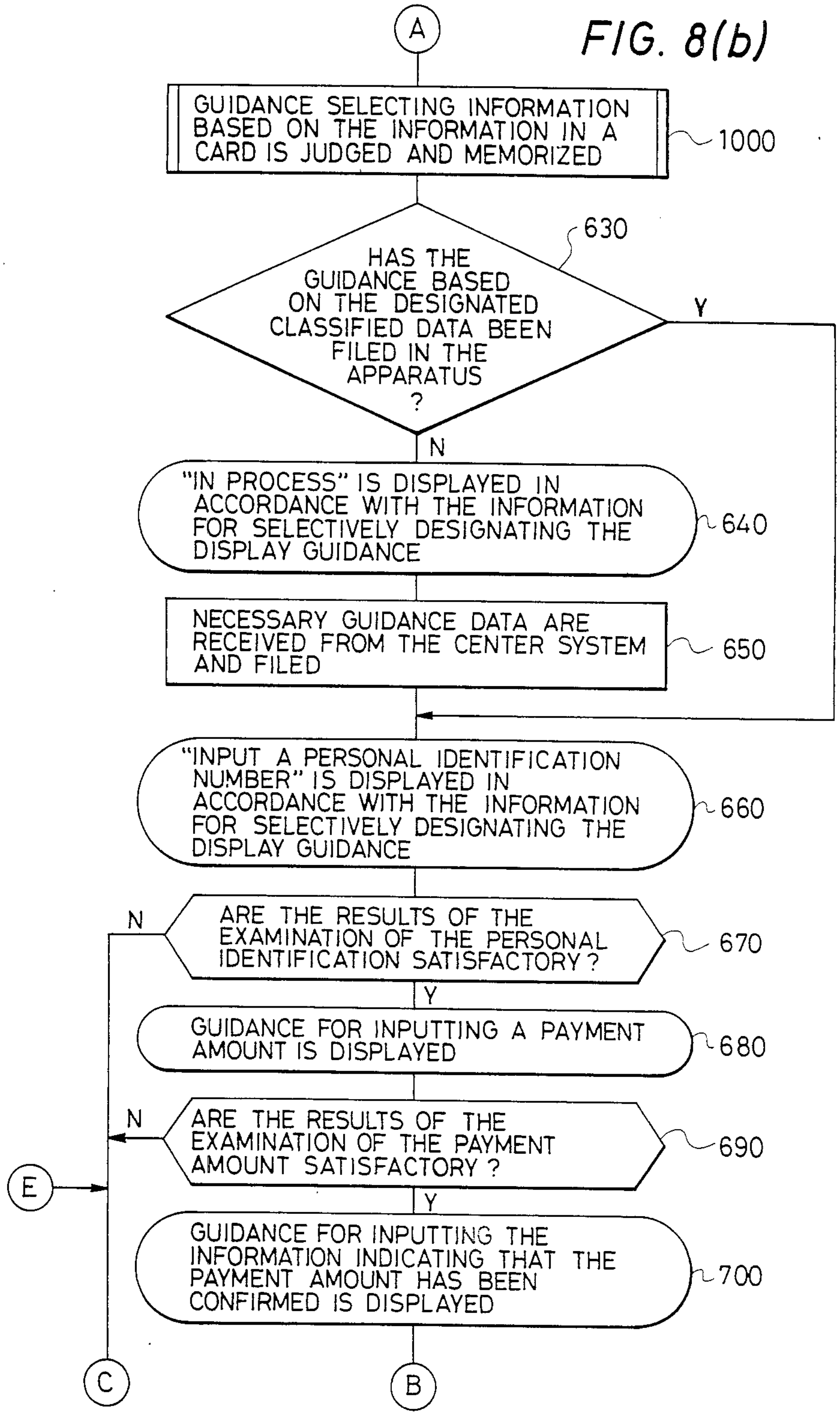
Figure 12A:
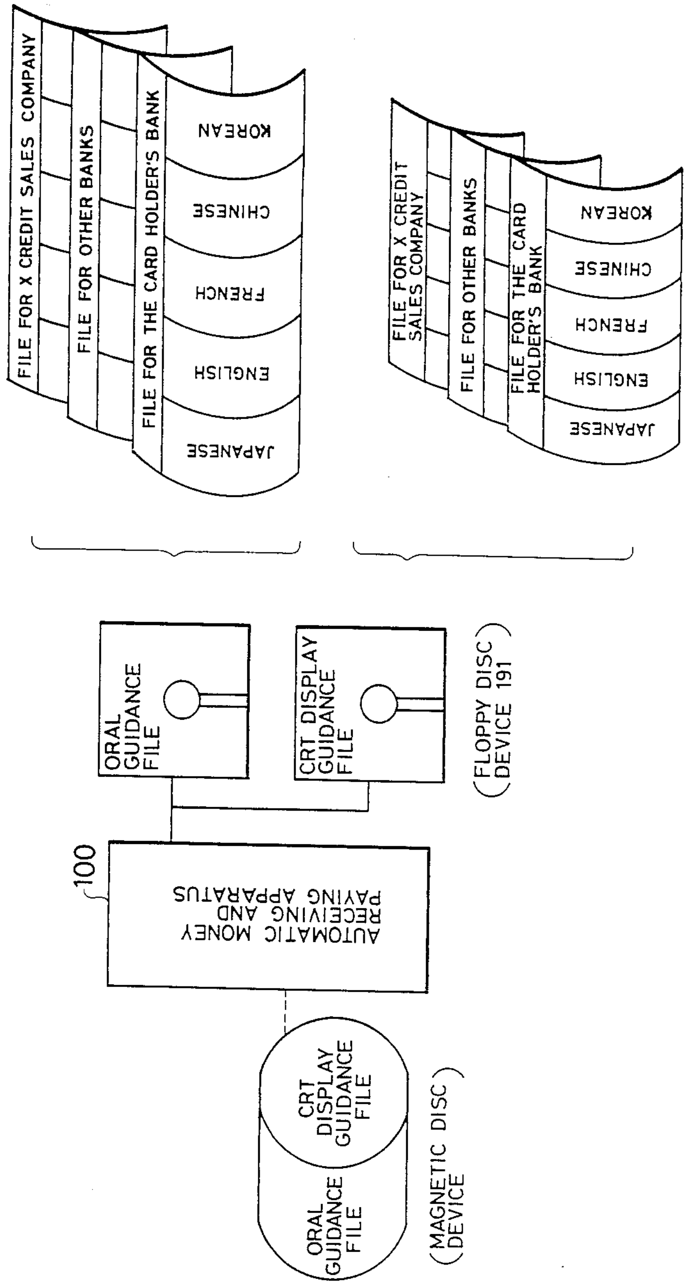
FIGS. 12(*a*) and 12(*b*) illustrate modes of filling guidance information.
Figure 12B:
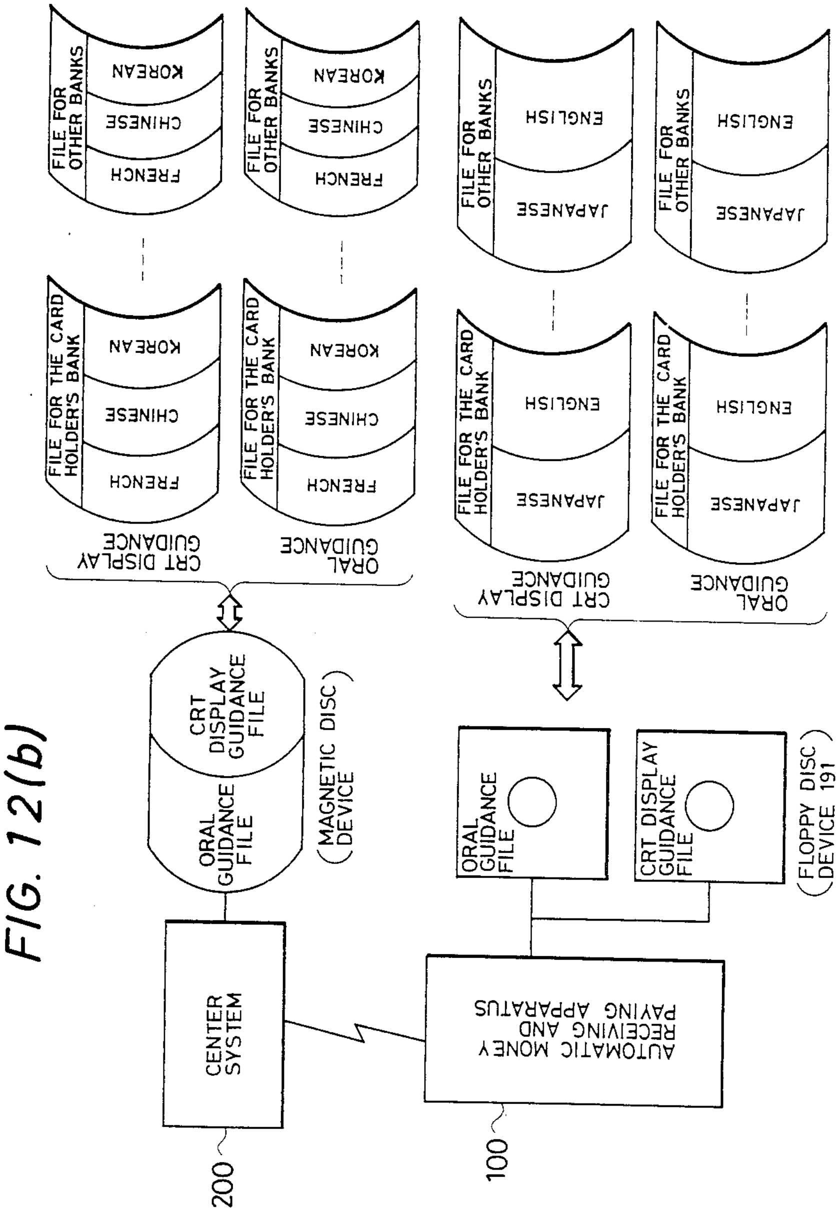
Figure 13:
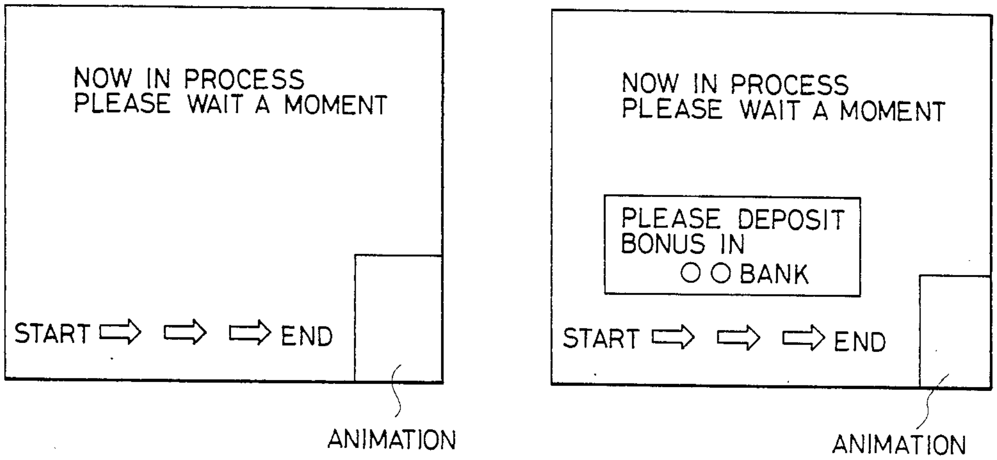
FIGS. 13–15(*b*) illustrate various guidance examples.
Figure 15A:
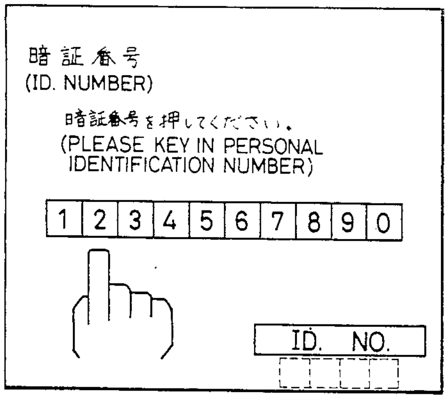
Figure 15B:
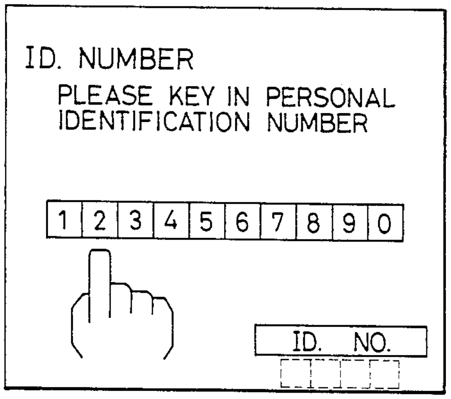
Figure 14:
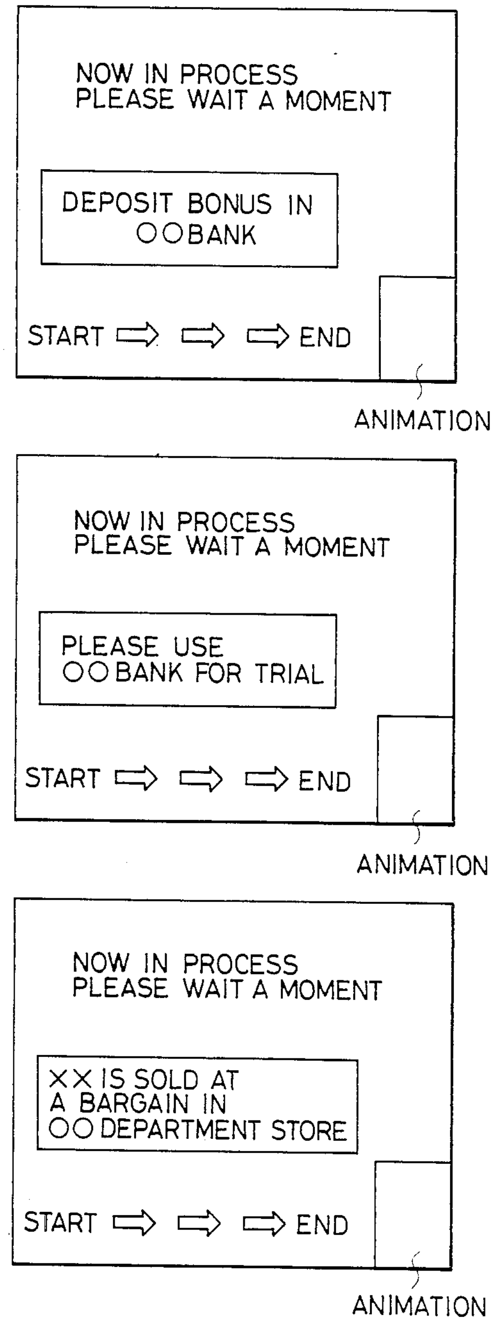

FIGS. 8(*a*)–11(*b*) are flow charts explaining the operation of this system, FIGS. 12(*a*) and 12(*b*) are an illustration of modes of filing guidance information, and FIGS. 13–15(*b*) illustrations of various examples of guidance to be displayed.

The operation of this automatic money receiving and paying system will now be described in accordance with the operational procedure stored in the external memory means 191.

Figure 9:
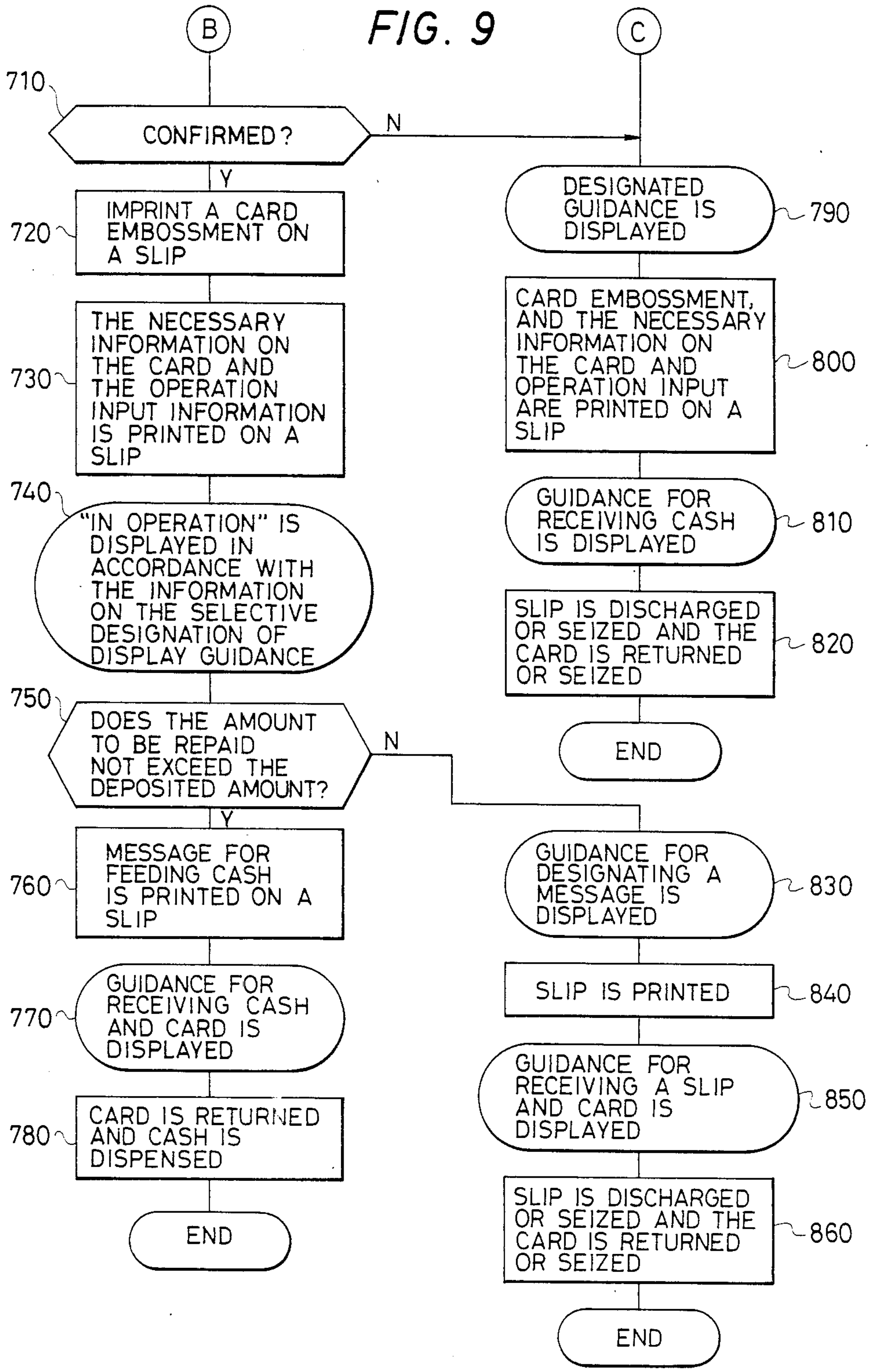

FIGS. 8(*a*), 8(*b*), and 10 are a set of flow charts, which are connected together at letters a–d. FIG. 9 shows the details of the procedure in a scoop 1000 in FIGS. 8(*a*) and 8(*b*).

First, referring to FIG. 8(*a*) when an electric current is applied from the power source to ATM, the latter is operated to automatically ascertain 510 that the preparations for an operation of ATM have already been completed in the control unit 190. When the preparations have not yet been completed, a subsequent step is not taken until the preparations have been completed. During this time, an examination is made 520 as to whether a signal indicating that the user is a visually-handicapped person has been detected. If the user is a visually-handicapped person, the information to the effect that the operation of the system is interrupted is given orally 530 so that even a visually-handicapped person can understand it. When a signal indicating that the user is a visually-handicapped person is not detected, i.e., when the user is a person other than a visually-handicapped person, the regular CRT guidance is given continuously by displaying "Operation Interrupted".

When the preparations for an operation of ATM have been completed, "In Operation" 540 and "Insert Your Card" 550 are indicated on the display to wait for a user. When a user inserts his card, a signal indicating that the user is a visually-handicapped person is detected in the same manner as mentioned above by the detecting means 195 or 196. When the user is a visually-handicapped person, the oral guidance (which may consist of a mere sound) for leading the user to ATM is made 580 so that he can stand before the apparatus. In this case, "Attendant Required" 220 is also displayed with a buzzer turned on so that a person in charge of the apparatus can help this user.

When a user inserts 560 his magnetic card 300 into a predetermined card-inserting slit, the card read/write unit 130 reads 600 the magnetic stripe 310 at a reproducing head thereof. This magnetic stripe contains, as shown in FIG. 3*b*, the information (horizontal and vertical parity) for ascertaining that the data have been read correctly through the hardware, the personal identification information, the information on the type of the card (a card issued by a bank or a credit loan company; a card issued by the bank (card holder's bank) in which the same ATM is installed, or some other bank), the information for indicating that the user is a visually-handicapped person or not, and the information on the nationality of the user. First, an examination is conducted 610 as to whether the data have been read correctly through the hardware. When the results of the examination are found satisfactory, as shown in FIG. 8(*b*) a guidance selection information judging and memorizing operation 1000 is carried out with reference to the information contained in the card.

In the guidance selection information judging and memorizing operation, selection for displaying the optimum guidance so that the user can deposit or draw out money easily is carried out on the basis of the information stored in a predetermined portion of the memory or the information for determining whether the guidance is changed by a special switch, the calendar information set by the timepiece 189 in the apparatus, and the information stored in the magnetic stripe.

Figure 10:
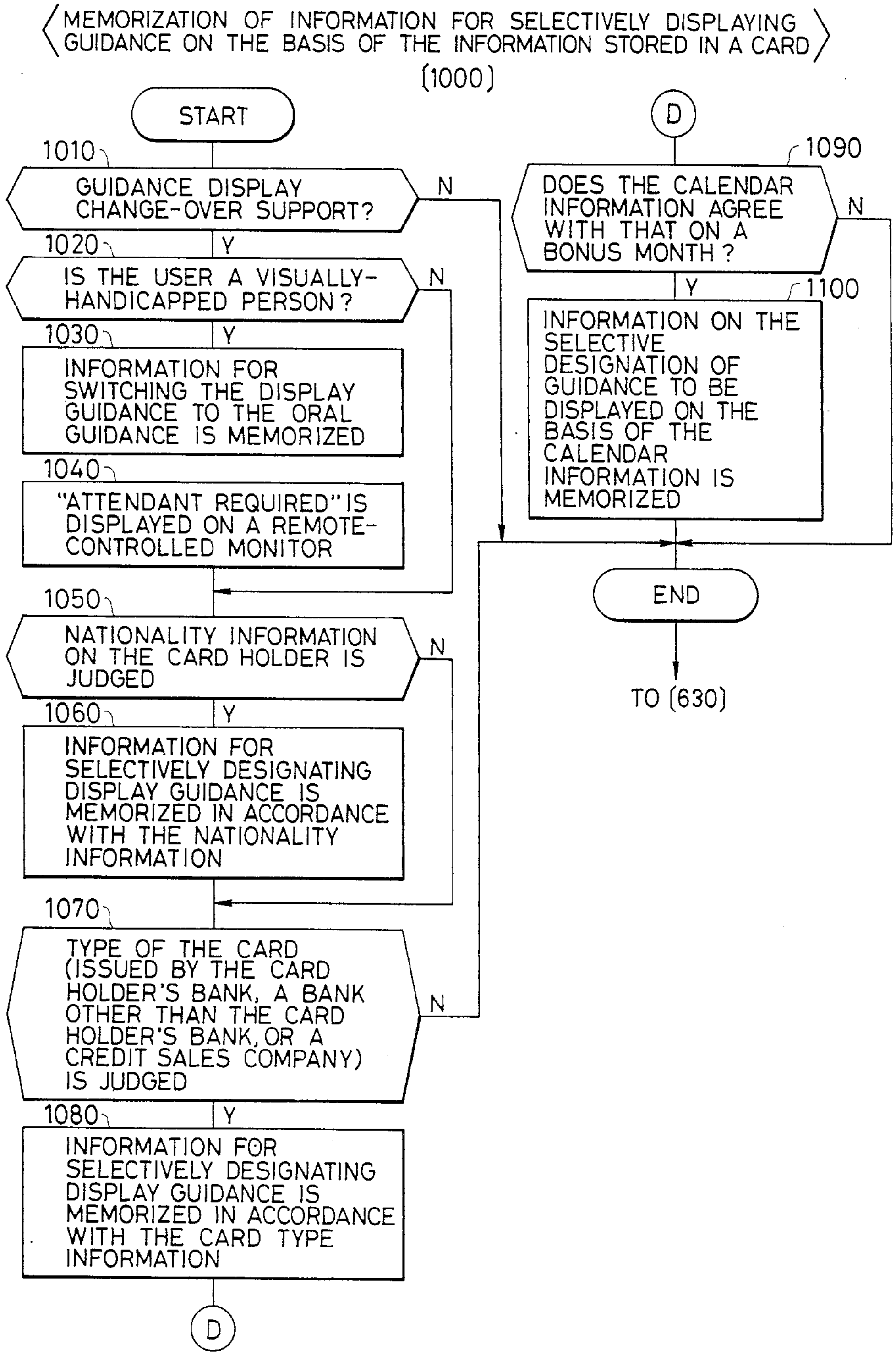

In case of a guidance display switching support, 1010 shown in FIG. 10 is stored. The card holder is judged 1020 to determine whether he is a visually-handicapped person. When the card holder is judged to be a visually-handicapped person, the information for making oral guidance is memorized 1030, and "Attendant Required" is displayed 1040 on RPL.

The nationality (for example, Japan and U.S.A.) of the card holder is determined 1050, and the information for selecting the guidance prepared in the native language of the user memorized 1060.

The type of the card is judged whether it is a card issued by the bank in which the ATM is installed, or a card issued by some other bank, or a card issued by a credit loan company cooperating with the bank in which the ATM is installed, and the information for selecting the guidance which suits the type of the card inserted by the user into the card-inserting slit is memorized 1080.

The necessity of displaying advertisement words which suits the season is judged 1090 on the basis of the calendar (month and day) information set in the timepiece, and the information for selecting the necessary guidance is memorized.

If judgement is made on the basis of a combination of the guidance selection information memorized through these operations, optimum guidance for users who operate the system can be determined.

A plurality of kinds of guidance is filed in the manner shown in FIGS. 12(*a*) and 12(*b*). The guidance in a plurality of languages is provided for each type of card, and stored on floppy discs. In this embodiment, the oral guidance is used for visually-handicapped persons, and both the oral and visual guidance for persons other than visually-handicapped persons. The guidance determined as mentioned above can be retained both in the mode shown in FIG. 12*a* and in the mode shown in FIG. 12*b*. In the mode of FIG. 12*a*, the files of all guidance are retained in ATM as an external memory means. In the mode of FIG. 12*b*, only the files of Japanese and English language guidance, which have a high frequency in use, are retained in ATM, and the files of guidance in other languages, which have a low frequency in use, in the center system 200, from which the guidance information can be received as necessary.

In order to receive guidance information from the center system, it is ascertained 630 taking the steps shown in FIGS. 8(*a*) and 8(*b*) that the guidance information determined by the above guidance selection information is now in a file in ATM. When such guidance information is not in a file in ATM, "In Process" is displayed 640, and guidance data are received from the center system and filed. As a matter of course, the guidance shown in FIGS. 13 and 14 is determined and displayed by utilizing the communication time during which the data are received from the center system. The guidance information which suits the user is determined in the above-mentioned manner, and retained in ATM. Referring to FIGS. 13 and 14, the bonus deposit guidance is made in a bonus season, and three arrows are lit regularly or flash in order in accordance with the progress of the operation of ATS.

Guidance for furnishing a personal identification number is then displayed 660, and, after the identification number has been received, it is examined 670. When the results of the examination are found satisfactory, guidance for requesting an amount of money to be paid out is displayed 680, and, after this amount has been displayed, it is examined 690. When the results of this examination is found satisfactory, guidance for requesting the same amount to be paid out is displayed 700. When this amount has been confirmed by the user 710 (the steps shown in FIG. 9 are then taken), the embossment on the card is imprinted 720 on a slip. The necessary items are printed 730 on the slip with reference to the information given on the card, and the guidance "In Process" is then displayed 740 (examples are shown in FIGS. 13 and 14). During this time, the user's balance is checked 750 through the communication between ATM and center system. When the results of the checking are found satisfactory, cash is dispensed to hand 780 the cash and card to the user. When the user's balance is erroneous (negative), the user is informed 830 of the fact and his card returned 820 with a message. When the results of each of the above-mentioned examinations are found unsatisfactory, the user is also informed 790 of the user with a message, fact and the user's card is returned or confiscated 820 depending upon the content of the error in the user's balance.

Figure 11A:
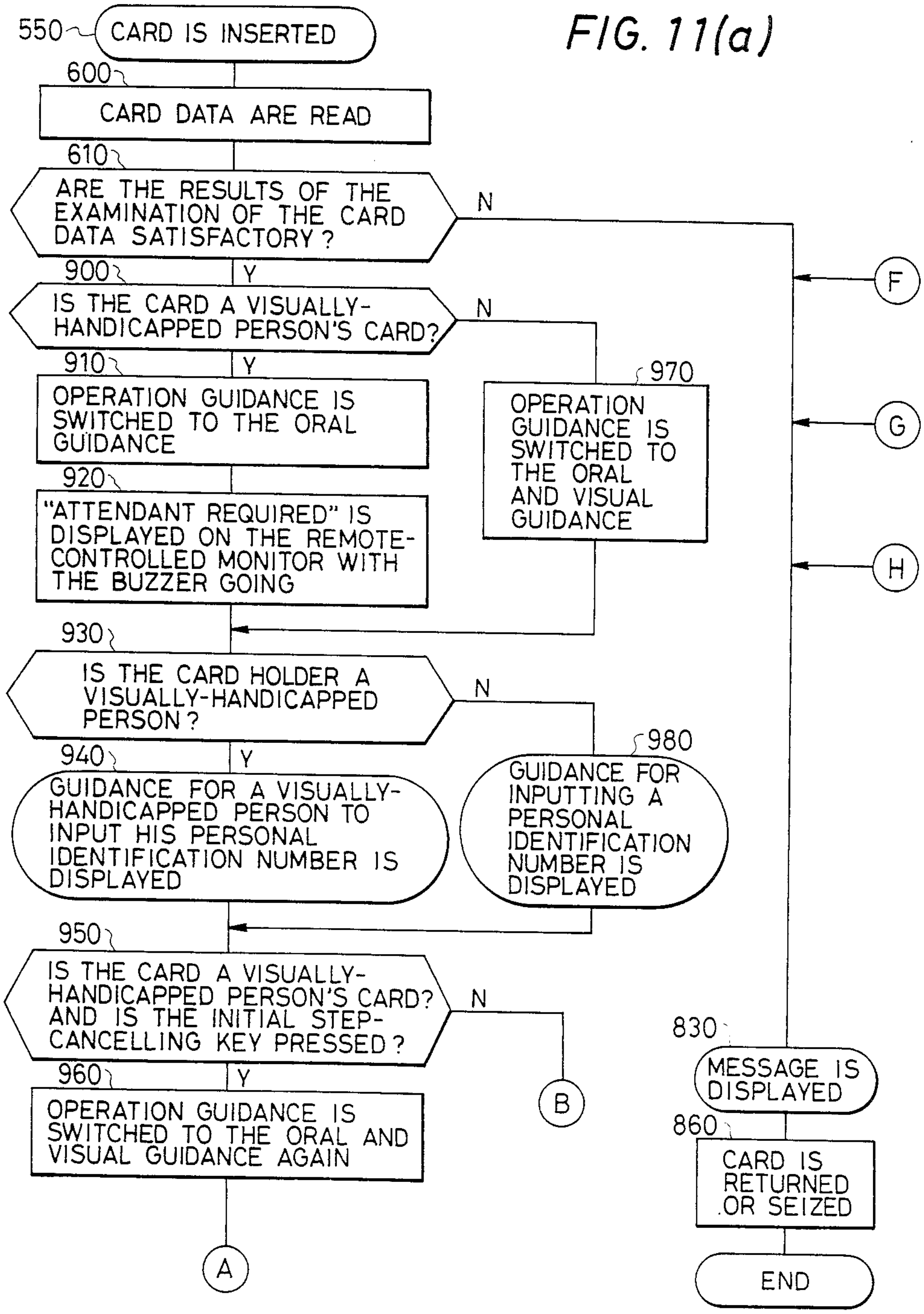
Figure 11B:
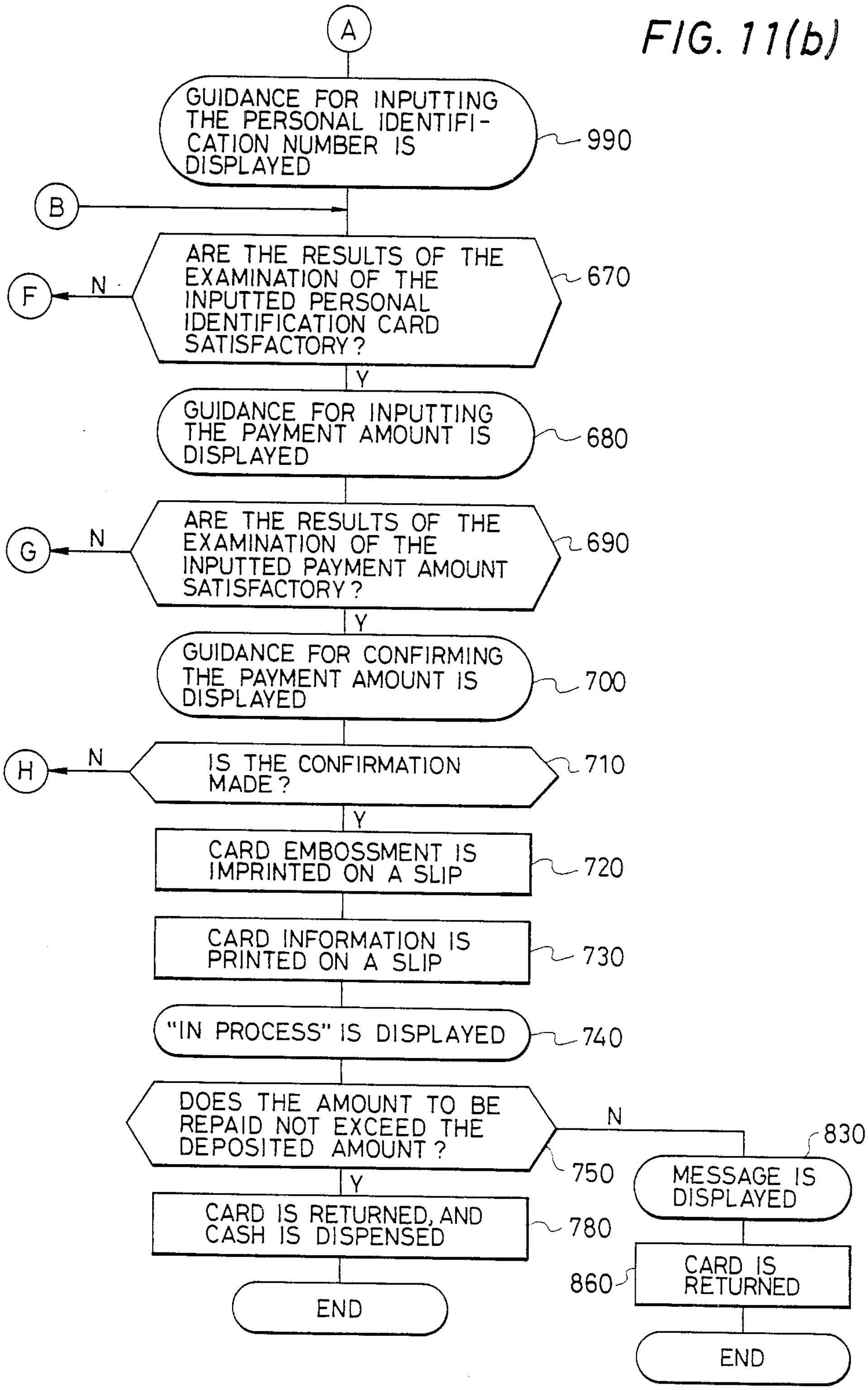

There is a case where a physically normal person, who was asked by a visually-handicapped card holder to deposit or draw out the latter's money by using the latter's card, is to operate an ATM. In this case, inconveniences occur if the guidance is switched automatically to the guidance prepared for a visually-handicapped person. FIGS. 11(*a*) and 11(*b*) are flow charts of a type of operational procedure for such a case. In this case, the sentences "I request the apparatus to be operated in accordance with the guidance for a visually-handicapped person" and "I request the guidance for a visually-handicapped person to be cancelled" are inserted 940 in the sentences of the oral guidance for furnishing a personal identification number of a visually-handicapped person, so as to make the person actually standing before the apparatus selectively designate the step to be taken. It is ascertained 950 whether a guidance-cancelling key has been pressed or not. This whether the guidance cancelling key has been presses indicates whether guidance can be switched 960 to the guidance for a physically normal person. FIGS. 15(*a*) and 15(*b*) show examples of words in the guidance to be indicated on CRT display, which guidance is switched from one to another depending upon the nationality of a physically normal user, these examples being displayed for a Japanese language speaking and an English language speaking individual, respectively, to have them press their personal identification numbers.

The nationality of a person and the language spoken by him do not always correspond to one another. Therefore, guidance in two languages, for example, guidance in Japanese and English of FIGS. 15*a* and 15*b* may be displayed at once in the same picture frame. The language, which the user can understand, instead of the information on the nationality of him as shown in FIG. 3*b* may be registered for the same reasons as mentioned above, in such a manner that this registered language information can be ascertained in the step 1050 in FIG. 10. This language information to be registered is determined in accordance with a user's request.

According to the present invention, which may be understood clearly from the above statement, a plurality of kinds of guidance information is stored in advance in an automatic money receiving and paying apparatus, and the information, which is recorded on a recording medium, on the characteristics of a user is read, the necessary kinds of information being then selected from the above-mentioned plurality of kinds of guidance information on the basis of the information on the characteristics of the user so as to use the selected information for guiding the user. Therefore, the operational guidance for a user can be done suitably, and the time for operating an automatic money receiving and paying apparatus can be reduced. In addition, the numbers of types of users can be increased.

We claim:

1. An automatic money receiving and paying apparatus, comprising:

detecting means for receiving from a transmitter holdable by a customer, a signal containing characteristic information about the customer, including information indicating a native language of a customer and whether the customer is a visually-handicapped person;

an information reading unit for receiving by reading characteristic information from a recording medium, including information indicating a native language of a customer and whether the customer is a visually-handicapped person;

a memory unit for storing a plurality of pieces of guidance information including oral guidance information in a plurality of native languages for visually-handicapped customers and visible guidance information for visually-non-handicapped customers;

a display unit including a visible guidance display and an oral guidance display, adapted to receive and display said guidance information, and to switch from the visible guidance display to the oral guidance display upon reception of oral guidance information; and a control unit adapted to select corresponding guidance information from said memory unit on the basis of said characteristic information including said information indicating a native language and whether a customer is a visually-handicapped customer received by one of said detector means and said information reading unit and to output said corresponding guidance information to said display unit when one of said detector means and said information reading unit receives the characteristic information about a visually-handicapped customer from said recording medium, said control unit being adapted to read the oral guidance information in the native language indicated by said characteristic information from said memory unit and supply the same to said guidance display unit when said characteristic information indicates that a customer is visually handicapped.

2. An automatic money receiving and paying apparatus according to claim 1, wherein said oral guidance information includes sound guidance information for leading the visually-handicapped customer to said apparatus, said control unit being adapted to read the oral guidance information received by said detecting means and supply sound guidance information to said guidance display unit to lead the customer to said apparatus.

3. An automatic money receiving and paying apparatus, comprising:

a detecting unit for receiving from a transmitter holdable by a customer, a signal containing characteristic information about the customer, including information indicating a native language of a customer and whether the customer is a visually-handicapped person;

an information reading unit for reading characteristic information including information on a recording medium about a native language of a customer and about whether a customer is a visually-handicapped person;

a memory unit for storing a plurality of pieces of guidance information in a plurality of native languages including oral guidance information for visually-handicapped customers and visible guidance information for visually-non-handicapped customers;

a display unit including a visible guidance display and an oral guidance display, adapted to receive and display said guidance information, and to switch from the visible guidance display to the oral guidance display upon reception of oral guidance information;

a control unit adapted to select corresponding guidance information from said memory unit on the basis of said characteristic information including said information about a native language and whether a customer is a visually-handicapped person, and to output said corresponding guidance information to said guidance display unit in the native language indicated by said information, said control unit being adapted to read from said memory unit and supply the oral guidance information in the native language indicated to said display unit when the characteristic information indicates a visually-handicapped customer; and a remote controlled monitor unit for observing the operational condition of a plurality of units of said apparatus by a person in charge whenever the characteristic information on said recording medium indicates a visually-handicapped customer, said display unit transmitting to said monitor unit guidance information indicating that the customer should be attended by another person whenever the visible guidance display is switched to the oral guidance display.

4. An automatic money receiving and paying apparatus according to claim 3, said oral guidance information including sound guidance information for leading the visually-handicapped customer to said apparatus, said control unit being adapted to read and supply the sound guidance information to said display unit to lead the customer of said apparatus.

5. A system for automatic transactions, comprising:

a detecting unit for receiving via a signal from a recording medium including a transmitter hand holdable by a customer, characteristic information indicating a native language for a holder of the recording medium and whether the holder has a specific physical handicap;

a card medium for storing symbols representing characteristic information indicating types of cards issued by an issuer of a holder of the card medium and indicating a native language for the holder and whether the holder has a specific physical handicap;

an information reading unit for receiving by reading the characteristic information from symbols on said card medium;

a memory unit for storing guidance information in a plurality of native languages corresponding to said characteristic information, said guidance information differing in content from said characteristic information;

a display unit adapted to receive said guidance information for disclosing the same to the holder; and a control unit adapted to select corresponding guidance information in the native language indicated by the characteristic information from said memory unit on the basis of said characteristic information including characteristic information indicating whether the holder has a specific physical handicap received by one of said detecting unit and by said reading unit, and to output said corresponding guidance information to said display unit.

6. A system for automatic transactions according to claim 5, further comprised of said card medium storing symbol information about a visually-handicapped customer, and having embossed-imprinted information including the card holder's name, account number and expiration of validity time, in regular characters and braille points.

7. An automatic money receiving and paying method, comprising:

receiving via one of a signal provided by a transmitter hand holdable by a customer and a card hand holdable by a customer, characteristic information indicating a native language for a customer and whether the customer is visually-handicapped;

reading from a memory on the basis of a native language indicated by said characteristic information oral guidance information in the native language indicated by the characteristic information for a visually-handicapped customer, when said characteristic information indicates that the customer is visually-handicapped;

supplying said oral guidance information to a display unit; and disclosing the oral guidance information for the customer in the native language indicated.

8. An automatic money receiving and paying method, comprising:

receiving from a source containing a transmitter, controlled by a visually-handicapped customer, a signal indicating a native language of the customer and that the customer is a visually-handicapped person;

reading from a memory on the basis of the native language indicated by the signal, oral guidance information including sound guidance information for a visually-handicapped person corresponding to the native language indicated by the signal received;

supplying said oral guidance information to a display unit; and disclosing the oral guidance information for a customer in the native language indicated.

9. An automatic money receiving and paying method, comprising:

receiving via one of a signal provided by a transmitter hand holdable by a customer and a card hand holdable by a customer characteristic information contained in a recording medium for indicating a native language of a customer and whether the customer is visually-handicapped;

reading from a memory oral guidance information in the native language indicated by the recording medium for a visually-handicapped customer when said characteristic information indicates that a customer is a visually-handicapped customer;

supplying said oral guidance information to a display unit;

disclosing the oral guidance information to a customer in the native language indicated; and transmitting at the same time to a monitor unit, guidance information indicating that the customer should be attended by another person.

10. An automatic money receiving and paying method according to claim 7 wherein, when a key for cancelling the information on a visually-handicapped customer has been pressed after information indicating that a customer is visually-handicapped was received in said characteristic information receiving step, corresponding guidance information is received in said guidance information receiving step to display visible guidance information for the customer on the basis of the information received.

11. An automatic money receiving and paying method according to claim 8, wherein, when a key for cancelling the information on a visually-handicapped customer has been pressed after information indicating that a customer is visually-handicapped was received in said characteristic information receiving step, corresponding guidance information is read in said guidance information reading step to display visible guidance information for the customer on the basis of the information received.

12. An automatic money receiving and paying method according to claim 9, wherein, when a key for cancelling the information on a visually-handicapped customer has been pressed after information indicating that a customer is visually-handicapped was received in said characteristic information receiving step, corresponding guidance information is read in said guidance information reading step to display visible guidance information for the customer on the basis of the information received.

13. A system for automatic transactions according to claim 5, wherein:

said display unit is adapted to transmit said guidance information to the holder of said medium via a plurality of modes of transmission, each of said modes being detectable by different ones of human senses; and said control unit selects modes of transmission from among said plurality of modes of transmission on the basis of said characteristic information and provides said guidance information to said display unit to be transmitted to the holder via modes of transmissions selected by said control unit.

14. An automatic money receiving and paying apparatus according to claim 1, further comprised of:

means for cancelling information indicating that a customer is a visually-handicapped customer, whereby said control unit selects from among said corresponding guidance information in said memory unit and provides guidance information to said guidance display unit for said visible guidance display whenever said information indicating that a customer is a visually-handicapped customer is cancelled by said cancelling means.

15. An automatic money receiving and paying apparatus according to claim 3, further comprised of:

means for cancelling information indicating that a customer is a visually-handicapped customer, whereby said control unit selects from among said corresponding guidance information in said memory unit and provides guidance information to said guidance display unit for visible guidance display whenever said information indicating that a customer is a visually-handicapped customer is cancelled by said cancelling means.

16. A system for automatic transactions according to claim 5, wherein:

said card medium stores symbols indicating whether a holder is a visually-handicapped person;

said memory unit stores oral guidance information for visually-handicapped customers and visible guidance information for visually-non-handicapped customers; and said control units selects from among oral guidance information and said visible guidance information on the basis of said symbols indicating whether a holder is a visually-handicapped person.

17. A system for automatic transactions according to claim 16, further comprised of:

means for cancelling information indicating that a customer is a visually-handicapped person, whereby said control unit selects from among guidance information stored in said memory unit and provides said visible guidance information for visually-non-handicapped customers to said display unit whatever said information indicating that a customer is a visually-handicapped person is cancelled by said cancelling means.

* * * * *